United States Patent
Miller (10) Patent No.: US 6,544,425 B2
(45) Date of Patent: Apr. 8, 2003

(54) METHOD FOR DEWATERING COAL TAILINGS AND SLURRIES AND REMOVING CONTAMINANTS THEREFROM

(75) Inventor: Olen O. Miller, Sugarcreek, OH (US)

(73) Assignee: Slurry Cleanup Environmental, Inc., Dover, OH (US)

(*) Notice: Subject to any disclaimer, the term of this patent is extended or adjusted under 35 U.S.C. 154(b) by 0 days.

(21) Appl. No.: 09/788,151

(22) Filed: Feb. 16, 2001

(65) Prior Publication Data

US 2002/0139754 A1 Oct. 3, 2002

Related U.S. Application Data

(60) Provisional application No. 60/269,550, filed on Feb. 16, 2001.

(51) Int. Cl.$^7$ ............................................... B01D 21/01
(52) U.S. Cl. .......................... 210/710; 209/5; 210/728; 210/732; 210/770; 210/787; 210/803; 210/806; 44/626
(58) Field of Search .......................... 209/5; 210/710, 210/712, 725, 726, 727, 738, 770, 787, 803, 806, 199, 202, 728, 732; 44/626

(56) References Cited

U.S. PATENT DOCUMENTS

| | | | |
|---|---|---|---|
| 3,408,293 A | * | 10/1968 | Dajani et al. .................. 209/5 |
| 3,578,586 A | * | 5/1971 | Gal et al. .................... 210/710 |
| 4,128,474 A | | 12/1978 | Ennis |
| 4,257,879 A | | 3/1981 | Bogenschnieder et al. |
| 4,526,121 A | | 7/1985 | Shudo et al. |
| 4,618,414 A | * | 10/1986 | Hartan et al. .................. 209/5 |
| 4,620,672 A | | 11/1986 | Leibson et al. |
| 4,775,468 A | * | 10/1988 | Peterson .................... 210/188 |
| 4,810,371 A | | 3/1989 | Fonseca |
| 4,999,115 A | * | 3/1991 | Peterson .................... 210/202 |
| 5,236,596 A | | 8/1993 | Greenwald, Sr. |
| 5,256,169 A | | 10/1993 | Roe |
| 5,346,630 A | | 9/1994 | Kenney |
| 5,476,522 A | | 12/1995 | Kerr et al. |
| 5,622,647 A | | 4/1997 | Kerr et al. |
| 5,643,443 A | * | 7/1997 | Ishikura .................... 210/113 |
| 5,795,484 A | | 8/1998 | Greenwald, Sr. |
| 5,843,315 A | * | 12/1998 | Baughn et al. ................. 209/5 |
| 6,042,732 A | | 3/2000 | Jankowski et al. |

OTHER PUBLICATIONS

Coagulationa nd Flocculation—Theory and Applications BOHUSLAV DOBIAS 1993, pp. 126–137 Publisher Marcel Dekker, Inc.

Coagulation and Flocculation edited by Bohuslav Dobias (1993) pp. 126–137.

* cited by examiner

Primary Examiner—Peter A. Hruskoci
(74) Attorney, Agent, or Firm—Sand + Sebolt (57) ABSTRACT

A method of dewatering a mixture of coal tailings, water and contaminants comprising the steps of (a) providing a tank having a base surface and introducing said mixture of coal, tailings, water, and contaminants to said tank and allowing said coal tailings to settle on said base surface, (b) removing the coal tailings from said base surface of said tank along with water and contaminants and then separating said water and at least some of said contaminants from said coal tailings wherein said separated contaminants are suspended in said separated water, (c) adding an agent selected from one or more of the group consisting of a coagulant and a flocculent to said water and suspended contaminants separated from the coal tailings in step (b), (d) allowing the agent added in step (c) to coagulate or flocculate with the suspended contaminants to form a coagulated or flocculated mass and a quantity of supernatant water, and (e) separating the coagulated or flocculated mass formed in step (d) from the quantity of supernatant water formed in step (d). An apparatus for practicing the method is also enclosed. A similar method and apparatus for dewatering and recovering process water from substantially clean coal slurry products and mineral slurries is also disclosed.

19 Claims, 6 Drawing Sheets

METHOD FOR DEWATERING COAL TAILINGS AND SLURRIES AND REMOVING CONTAMINANTS THEREFROM

CROSS REFERENCE TO RELATED APPLICATIONS

This application is related to U.S. Application Ser. No. 60/269,550 filed on Feb. 16, 2001.

BACKGROUND OF THE INVENTION

1. Technical Field

The present invention relates to methods and apparatus for separating solids from liquids and other solids and, in particular, to dewatering and decontaminating coal tailings, clean coal products, and mineral slurries. The present invention also relates to methods and apparatus for liquid purification and, in particular, to methods and apparatus for recovering decontaminated process water from coal tailings, clean coal products and mineral slurries.

2. Background Information

In the cleaning or washing of coal for commercial use as a fuel and the like, the uncombustible ash content of coal is usually removed to enhance the heat content of the coal. Reduction in the ash content results in savings in transportation and ash disposal costs. Other materials frequently occurring with coals that may be removed in washing operations include various clays and sulfides. Such clays commonly include aericite ($KAl_2(AlSi_3O)(OH)_{12}$, smectite ($Al_2Si_4O_{10}(OH_{12})H_2O$, and kaolinite clays ($Al_2Si_4O_5(OH)_4$. Sulfides are usually pyrite ($FeS_4$ (isometrical)).

During the processing of coal to effect such washing, a coal refuse slurry is generated. This slurry comprises coal fines known as tailings, and contaminants such as clay and mud suspended in plant process water. Due to the high volume of water used in the processing of coal, it is necessary to reclaim the wash water for recirculation in the plant. The concentrated solids are sent to an impoundment pond for disposal. In some cases in which coal washing plants have been operating for years, such slurry ponds may occupy hundreds of acres and may contain millions of tons of coal fines. These slurry ponds may also contain coal slurry to a depth of 70–150 feet. Such slurry ponds not only occupy a great deal of valuable land, but they also contain a considerable amount of energy and water resources.

Clean coal slurries are also used as, for example, an effective and cost effective means for transporting coal over distances from the place of production to the place of use.

The prior art discloses various methods and apparatuses for dewatering and decontaminating refuse pond coal slurries and for dewatering clean coal slurries.

U.S. Pat. No. 4,128,474 to Ennis discloses a wet mechanical process for cleaning, upgrading and dewatering fine coal. The process provides for forming an aqueous feed slurry of fine coal and its associated contaminant particles wherein all particles have a particle portion size of less than about 6 mm. ranging to zero. The feed slurry is separated into coal slurry and refuse slurry portions in a spiral gravity concentrator by removing contaminants having a particle size greater than about 0.15 mm. The concentrated coal slurry is then fed to a hydrocyclone separator where all the. ultra-fine silt material having a particle size of less than 0.15 mm. is removed and the coal particle fraction 6 mm. to 0.15 mm. is accumulated and thoroughly dewatered.

U.S. Pat. No. 4,257,879 to Bogenschneider, et al. discloses a coal slurry dewatering process in which the fine grain content is regulated to keep the filter cake at a constant level. A separation of the slurry into a predominantly relatively fine grain fraction and a relatively coarse grain fraction, with the division point being between about 0.03 and 0.15 mm. is carried out with a formation. if a coal agglomerate from the fine grain fraction is accomplished.

U.S. Pat. No. 4,526,121 to Shudo, et al. discloses a ship for treating a coal slurry comprising a pair of opposed trays disposed in the vicinity of the upper deck for causing the coal slurry supplied thereto to flow forward and delivering the slurry, a slanting dewatering screen disposed below each of the trays for dewatering the coal slurry delivered from the tray to separate a particulate coal fraction having relatively large particle sizes and conveyors for transporting to a specified position on the upper deck the particulate coal fraction dewatered and falling off the screen.

U.S. Pat. No. 4,620,672 to Liebson, et al. discloses a system for converting a coal slurry flowable through a pipeline to a coal water mixture capable of being rendered suitable for direct combustion in a boiler. The system includes a pipeline extending from a region adjacent to a mine or source of a coal to a region adjacent to a boiler or furnace at which combustion is to take place. In the furnace region, the slurry from the pipeline is directed into a holding space, such as a pond, from which it is directed to a grinding apparatus. On the way to the grinding apparatus from the pond, a side stream of the slurry is directed through a dewatering apparatus where the concentration of the side stream is increased form 50–55 weight percent of solids to about 70–80 weight percent of solids. The outlet of the dewatering apparatus is directed back to the main flow of slurry from the pond, and the main flow enters the grinding apparatus where the slurry is ground to a particle size suitable for combustion, such as 70–80% weight percent of solids at 200 mesh. The ground slurry can then be directed into a small agitated. tank and from this tank it can be directed into the boiler or furnace for combustion.

U.S. Pat. No. 4,810,371 to Fonseca discloses a process for automating fine coal cleaning including monitoring the operation of a flotation cell for separating coal from ash impurities by automatically detecting the coal content of the tailings from the cell and controlling the supply of additives to the cell to optimize slurry coal recovery and automatically monitoring the fluid level of the coal slurry in a dewatering filter tub to control the supply of additives to the filter tub and functioning of a dewatering filter.

U.S. Pat. No. 5,236,596 to Greenwald, Sr. discloses a method and apparatus for dewatering an aqueous coal slurry which includes imparting high shear forces to the aqueous coal slurry in the presence of a peptizing agent to render coal particles hydrophobic by stripping clay from the coal particles and peptizing the clay in the aqueous medium of the slurry. The slurry is separated to recover coal particles and the aqueous medium is drained from the coal particles.

U.S. Pat. No. 5,256,169 to Roe discloses a process for dewatering and agglomerating fine coal. The process consists of treating an aqueous fine coal slurry with a chemical binding agent prior to filtration or drying. The preferred chemical binding agent is an emulsifiable process oil. Efficiencies in dewatering and in low dustiness of the treated coal are disclosed.

U.S. Pat. No. 5,346,630 to Kenney discloses a process for the vacuum filtering of coal slurries. Dewatering of a filter cake is achieved by contacting the coal with a $C_8$–$C_{20}$ aliphatic carboxylic acid or a derivative thereof, especially sodium oleate.

U.S. Pat. No. 5,476,522 to Kerr, et al. discloses a method for concentrating coal tailings and for dewatering coal products employing a copolymer of diallyldimethlylammonium halide and a vinyl alkoxysilane, preferably a copolymer of diallyldimethylammonium chloride and vinyltrimethoxysilane as a coagulant. The method for concentrating coal tailings comprises steps of feeding the coal tailings to a thickener; treating the coal tailings with the coagulant, discharging substantially concentrated tailing; and withdrawing substantially clarified liquid from the thickener. A method for dewatering coal products containing water comprising the steps of feeding the clean coal containing water to a twin belt filter press; treating said coal with an effective amount of a copolymer coagulant of diallyldimethlylammonium halide and vinyl alkoxysilane, preferably diallyldimethlylammonium chloride and vinyl trimethoxysilane is also disclosed. The method encompasses removing water from the coal product through the addition of the subject polymer coagulant; removing the dewatered clean coal product from the filter; and withdrawing the recycled water through the filter.

U.S. Pat. No. 5,622,647 to Kerr, et al. discloses a method for dewatering coal tailings, clean coal products and mineral slurries, as well as for the clarification of water contained in coal refuse slurries, employing a copolymer of diallyldimethylammonium halide and a vinyl alkoxysilane, which is preferably a copolymer of diallyldimethyl-ammonium chloride and vinyltrimethoxysilane as a coagulant.

U.S. Pat. No. 5,795,484 to Greenwald, Sr. discloses a method and apparatus for dewatering an ultra-fine coal particle fraction forms a coal product with particles that are dilatant due to the mechanical stripping of the clay contaminants from the coal surface and the subdividing of the clay to clay platelets which are peptized to maintain discreetness in an aqueous slurry. The coal particles are unflocculated and can produce an aqueously permeable barrier on a sieve. The ultrafine coal product has an increase of 100–150 BTU per pound and when combusted reduced $NO_x$ production of 20–40% is realized. In a 15×0 micron coal fraction, the sulphur content is significantly reduced.

U.S. Pat. No. 6,042,732 to Jankowski, et al. discloses a method for dewatering coal tailings, clean coal products and mineral slurries with an effective coagulating amount of a combination of a cationic polymer and a starch. A preferred cationic polymer is poly(dimethylaminoethylaerylate methyl chloride quaternary salt) and preferred starches are unmodified.

A need still exists for a further improved method and apparatus for dewatering and decontaminating coal tailings and recovering water therefrom.

A need also still exists for a further improved method and apparatus for dewatering and decontaminating clean coal slurry products and mineral slurries and reconveying process water therefrom.

SUMMARY OF THE INVENTION

It is an object of the present invention to provide an efficient and cost effective method and apparatus for dewatering coal tailings and for removing contaminants therefrom.

It is a further object of the present invention to provide an efficient and cost effective method and apparatus for dewatering substantially clean coal slurries and to remove any contaminants present therefrom.

It is a further object of the present invention to provide an efficient and cost effective method and apparatus for dewatering other mineral slurries and to remove any contaminants therefrom.

It is a further object of the present invention to provide an efficient and cost effective method and apparatus for reclaiming valuable water from coal refuse slurry ponds.

It is a further object of the present invention to provide an efficient and cost effective method and apparatus for reclaiming valuable process water from substantially clear coal slurry products.

It is a further object of the present invention to provide an efficient and cost effective method and apparatus for reclaiming valuable process water from other mineral slurries.

It is a further object of the present invention to provide an efficient and cost effective method and apparatus for reclaiming valuable land resources from land previously occupied by coal refuse slurry ponds.

It is a further object of the present invention to provide an efficient and cost effective method and apparatus for a ameliorating or eliminating any environmental risk to soils and water tables which may be presented by coal refuse slurry ponds.

It is a further object of the present invention to provide a method and apparatus for efficiently and cost effectively dewatering coal tailings and removing contaminants therefrom which is mobile and can readily be moved to It is a still further object of the present invention to provide a method and apparatus for efficiently and cost effectively dewatering coal tailings and removing contaminants therefrom which is compact and adapted to being used on sites where the available land for such operations is limited or where such available land is located on hilly, mountainous or otherwise uneven terrains.

These and other objects of the present invention are provided by the method of the present invention, which is a method of dewatering a mixture of coal tailings, water and contaminants comprising the steps of (a) providing a tank having a base surface and introducing said mixture of coal, tailings, water, and contaminants to said tank and allowing said coal tailings to settle on said base surface, (b) removing the coal tailings from said base surface of said tank along with water and contaminants and then separating said water and at least some of said contaminants from said coal tailings wherein said separated contaminants are suspended in said separated water, (c) adding an agent selected from one or more of the group consisting of a coagulant and a flocculant to said water and suspended contaminants separated from the coal tailings in step (b), (d) allowing the agent added in step (c) to coagulate or flocculate with the suspended contaminants to form a coagulated or flocculated mass and a quantity of supernatant water, and (e) separating the coagulated or flocculated mass formed in step (d) from the quantity of supernatant water formed in step (d).

This coal slurry cleanup is unique in that it does not matter as to the size or volume of a pond. The system consists of a completely portable plant and can be moved from one location to another in a matter of days. It operates on air, hydraulics and electric generator, and can be put in very remote areas. A dredge is put into a slurry pond to pump the material. This material consists of coal, water, clay, mud, or whatever else may have been deposited. The dredge must be adequate in size to pump the volume of material and water needed to operate the plant. In most cases, a volume of 800 GPM to 1500 GPM will be required. This coal slurry cleanup consists of a method where a portable plant is assembled wherever coal slurry is found to be recoverable, normally where coal prep plants have been operating for a period of time. The slurry will then be brought to the plant and processed to where there will be a steady stream of coal from a discharge belt to a stockpile. A backflow of waste water will flow to a clarifier tank which will allow the clay, mud and other heavy materials to settle out. The heavy material will then be pumped to a hydraulic press where the water is separated from solids. The solids will then be discharged to a stockpile and the water will return to the pond for use or can be let into a water stream.

Also encompassed within the present invention is a method of dewatering substantially clean coal slurry products comprising the steps of (a) providing a tank having a base surface and introducing the substantially clean coal product into said tank and allowing fine coal to settle on said base surface, (b) removing the fine coal from said base surface of said tank along with water and contaminants and then separating said water and at least some of said contaminants from said fine coal wherein said separated contaminants are suspended in said separated water, (c) adding an agent selected from one or more of the group consisting of a coagulant and a flocculent to said water and suspended contaminants separated from the fine coal in step (b), (d) allowing the agent added in step (c) to coagulate or flocculate with the suspended contaminants to form a coagulated or flocculated mass and a quantity of supernatant water, and (e) separating the coagulated or flocculated mass formed in step (d) from the quantity of supernatant water formed in step (d).

Also encompassed within the present invention is a method of dewatering other mineral slurries comprising the steps of (a) providing a tank having a base surface and introducing said mineral slurry into said tank and allowing said mineral fines to settle on said base surface, (b) removing the mineral fines from said base surface of said tank along with water and contaminants and then separating said water and at least some of said contaminants from said coal tailings wherein said separated contaminants are suspended in said separated water, (c) adding an agent selected from one or more of the group consisting of a coagulant and a flocculent to said water and suspended contaminants separated from the mineral fines in step (b), (d) allowing the agent added in step (c) to coagulate or flocculate with the suspended contaminants to form a coagulated or flocculated mass and a quantity of supernatant water, and (e) separating the coagulated or flocculated mass formed in step (d) from the quantity of supernatant water formed in step (d).

Also encompassed within the present invention is an apparatus for use in processing a liquid and at least one solid particulate material mixed with in said liquid said apparatus comprising a tank having a front end and a rear end, a base surface and a peripheral wall, an input point positioned adjacent the rear end of the tank extending generally upwardly from and surrounding the base wall, an output point positioned adjacent the front end of the, a particle collection area positioned on the base surface beneath the input point, and means for conveying the particles extending from adjacent the particle collection area to the output point.

Also encompassed within the present invention is an apparatus for use in processing a liquid and at least one solid particulate material mixed with liquid. This apparatus includes a tank having a front rear end, a base surface and a lateral wall having an upper rim. An input point is positioned adjacent the rear end of the tank adjacent the upper rim of the tank. An output point is positioned adjacent the front end of the tank. A particle collection area is positioned on the base surface beneath the input point, and a particle conveyor means extends from adjacent the particle collection area to the output point. There is a means for separating particles and water removed from the tank, a means for adding a coagulant or flocculant to the water, a second tank directly connected to the first tank, and means for removing a coagulated or flocculated mass from clarified water.

Also encompassed within the present invention is an apparatus for reducing the concentration of a particulate material and a liquid. The apparatus has a flow cavity having an input opening for the liquid with suspended particulate material and a restricted output opening for particulate material. The flow cavity has at least one perforated wall having an outer surface from which liquid having a reduced concentration of particulate material is collected.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

DESCRIPTION OF THE PREFERRED EMBODIMENTS

Figure 1:
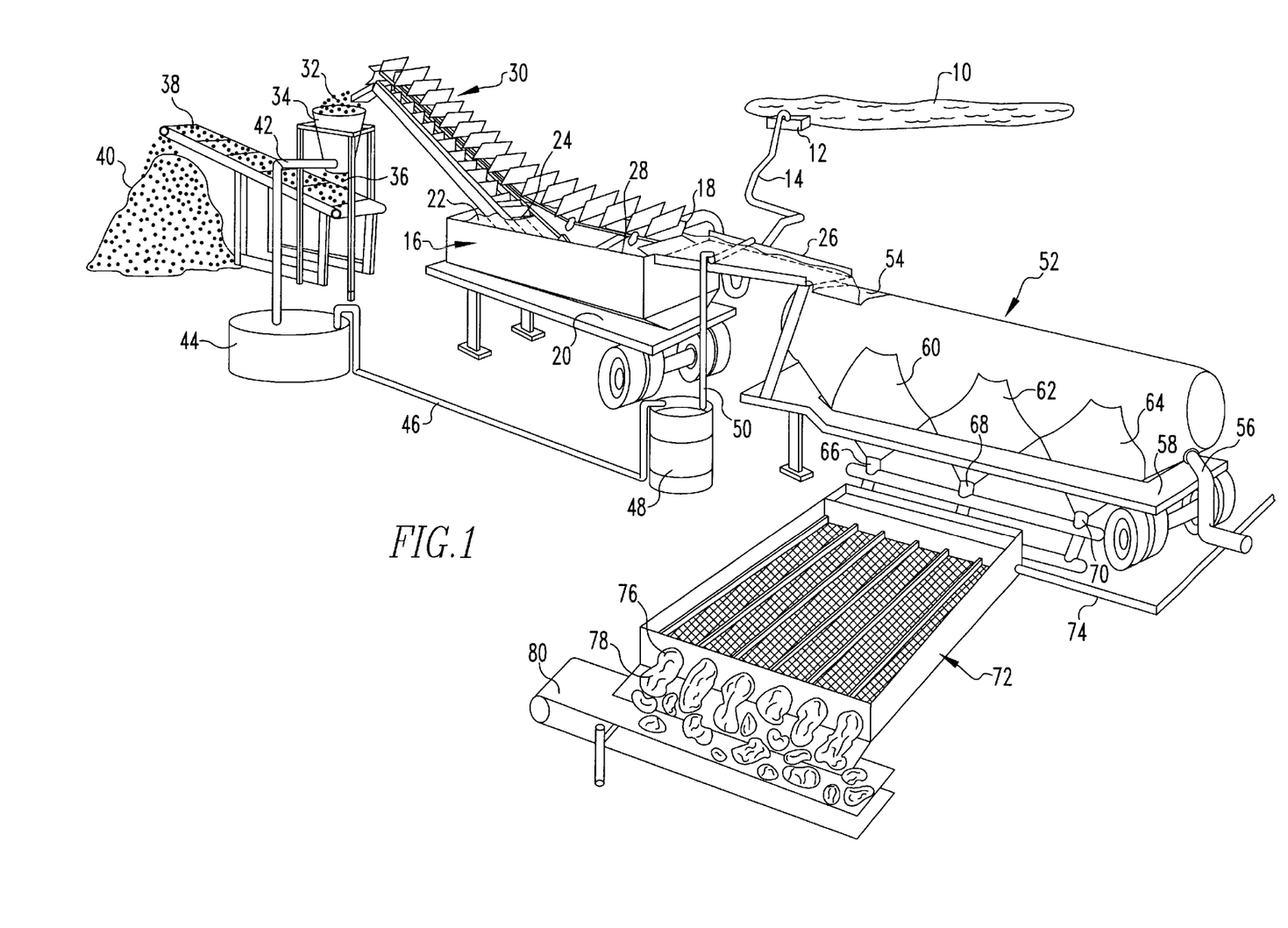
FIG. 1 is a perspective view of the apparatus used in a preferred embodiment of the method of the present invention.

Referring to FIG. 1 there is a pond 10 with coal fine washing tailings or "coal tailings" having dimensions from about 0.25 inch down to about 0.001 inch. Along with these coal tailings, there are contaminants which may include clay, silt, mud and pyrite. These coal tailings are removed from pond 10 by a dredge 12 along with water in line 14 to a tank 16 which is referred to herein at various points as a "drag tank". Preferably, the amount of water in the mixture of fine coal, contaminants and water in line 14 is adjusted to from about 60 percent to about 90 percent by weight. The drag tank 16 has an input point 18 and is mounted on a truck mount 20 so as to be mobile. The tank 16 contains a water, fine coal and contaminant mixture 22 and has an output point 24 for removal of fine coal and contaminants mixed with water. The tank 16 also has a discharge trough 26 for removal of water 22 adjacent a rim 28. There is a conveyor system 30 which extends from the output point 24 of the tank 16 to remove fine coal and water 32 to a centrifuge 34. Preferably, the amount of water in the mixture of fine coal, contaminants and water 34 is from about 10 percent to about 40 percent by weight. This centrifuge 34 separates clean fine coal 36 and deposits this fine coal on a conveyor belt 38 for removal to a stored fine coal deposit 40. Preferably the centrifuge is a model no. EBW-36 centrifuge manufactured by CMI, Inc. of St. Louis, Mo. which is preferably operated at from about 1800 RPM to about 4200 RPM. Those skilled in the art will appreciate that other equivalent means of separating particles from water such as a filter press, a screw press, a belt filter, or a screen may be substituted for the centrifuge 34. It is believed, however, that the centrifuge 34 would be the preferred means of separating such fine coal from water since clay contaminants may tend to adhere to coal particles, and centrifuging the fine coal and water may create sufficient shear to remove the clay from the coal particles. Such clay, which may be in a platelet shape, may become suspended in the water once removed from coal particles. Extending from the centrifuge 34 there is a centrifuge output line 42 which removes water and contaminants to a settling tank 44. A settling tank discharge line 46 removes water and suspended contaminants to a polymer addition tank 48 from where polymer addition tank output line 50 extends to the discharge trough 26 from the tank 16 by means of which a coagulating or flocculating agent is added to the water in discharge trough 26. This coagulating or flocculating agent may be an anionic or cationic polymer or a nonionic emulsion polymer. Such flocculents are preferably introduced into the total amount of water being introduced to the clarifier tank in an amount of from about 2 percent to about 6 percent by weight. The polymer may also be used with a starch in the manner disclosed, for example, in the aforesaid U.S. Pat. No. 6,042,732 to Jankowski, et al. which also discloses suitable flocculent polymers for use in the method of this invention. Specific suitable flocculent polymers for use in the method of the present invention are also disclosed in the aforesaid U.S. Pat. Nos. 5,476,522 and 5,622,647 both to Kerr, et al. Inorganic coagulants which are known in the art such as alum and iron salts may also be used. The discharge trough 26 empties into a clarifier tank 52 at a tank input 54. The clarifier tank 52 is set on a truck mount 58 to allow the clarifier tank 52 to be mobile. The clarifier tank 52 has three settling sections 60, 62 and 64 which empty respectively into discharge lines 66, 68 and 70 which connect to hydraulic filter press 72. The hydraulic filter press 72 has a water output line 74. The hydraulic filter press 72 also has a plurality of solid output apertures as at aperture 76 where clay and other contaminants 78 are outputted as solids onto conveyor belt 80. The structure and operation of this hydraulic filter press 72 is essentially the same as the embodiment shown in FIGS. 6–10 and described in greater detail hereafter. While the centrifuge 34, settling tank 44, polymer addition tank 48, and hydraulic filter press 72 are not shown with a trailer mount, it will be understood that these components of the entire assembly, along with their associated piping and belting systems, may be readily disassembled and loaded onto a trailer for transporting such components to remote operation sites. Such sites may be located in hilly, mountainous, or uneven terrain and the entire apparatus may be readily and quickly reassembled for operation in an area where only relatively small amounts of level land are available. In practice, it is found that the entire assembly may be transported to an operations site on from about 3 to 5 tractor trailer combinations. It is also found that the entire apparatus may be assembled for use on only about 5,600 to 15,600 square feet of relatively level land.

Figure 2:
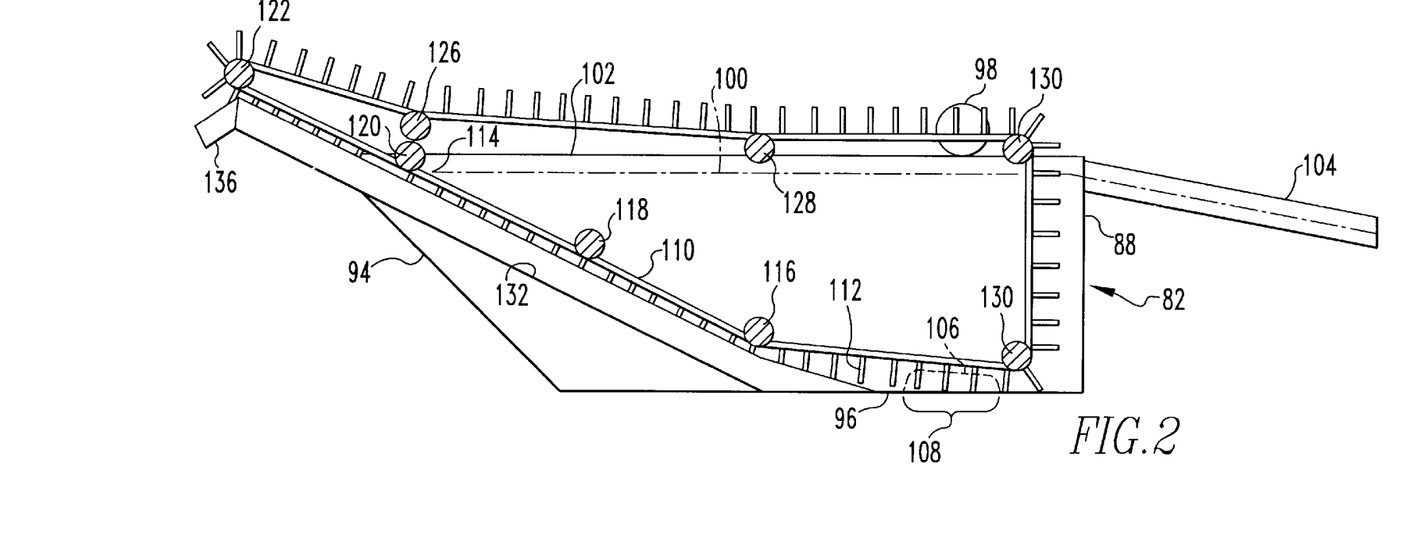
FIG. 2 is a detailed vertical cross sectional view of a preferred embodiment of the drag tank similar to the one shown in FIG. 1.
Figure 3:
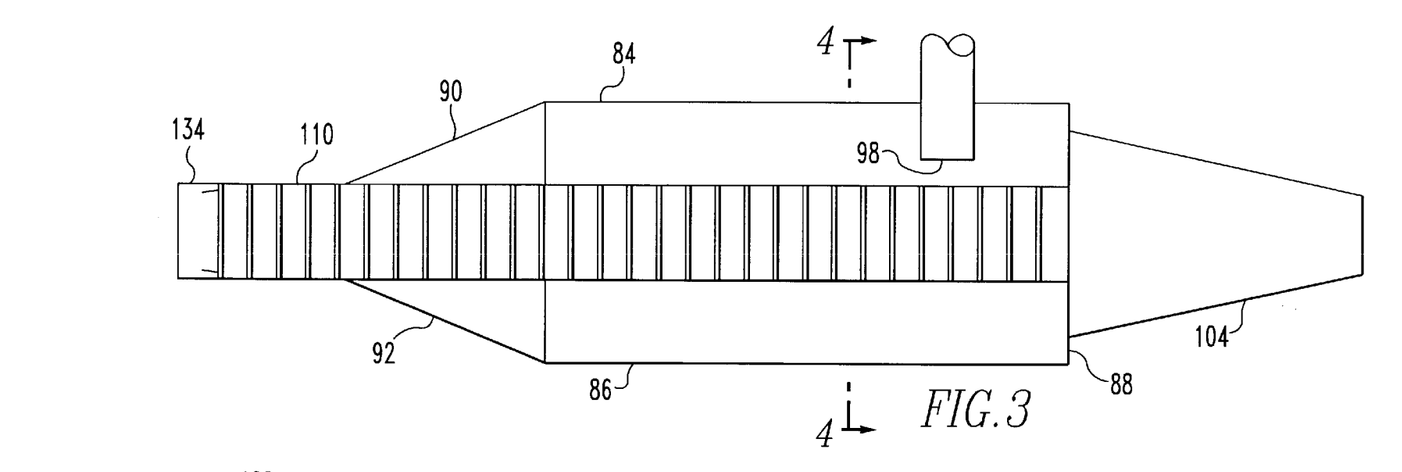
FIG. 3 is a top plan view of the drag tank apparatus shown in FIG. 2.
Figure 4:
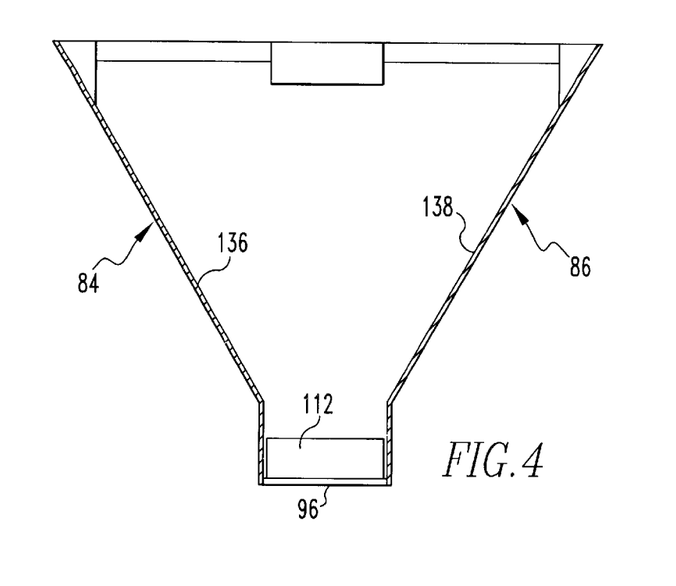
FIG. 4 is a cross sectional view through 4—4 in FIG. 3.

Referring to FIGS. 2–4, another embodiment of the drag tank described is shown generally at numeral 82. This tank has a pair of sidewalls 84 and 86, a rear end wall 88, front oblique walls 90 and 92, a front end wall 94, and a base wall 96. The tank 82 also has a water and coal fine mixture input point 98 by means of which the mixture is added to water 100 in the tank 82 which is maintained beneath the rim 102 of the tank 82 by a water discharge ramp 104. Directly beneath the water and coal fine input 98 there are collected fine coal 106 on a collection area 108 on the base wall 96. There is a continuous conveyor chain 110 with a plurality of outwardly extending paddles as at paddle 112 for moving the collected fine coal 106 to a solids discharge point 114. As an alternative to using the conveyor chain 110, a conveyor belt may be used. As an alternative to using the paddles as at paddle 112, scoop or shovel shaped devices may be used to move the collected fine coal 106 to the solids discharge point 114. The continuous conveyor belt 110 moves on rollers 116, 118, 120, 122, 124, 126, 128, and 130. In parallel spaced relation to the conveyor belt is a central ramp 132 which is angled upwardly and has a terminal downwardly angled section 134. Preferably the angle of this central ramp 132 will be from about 20° to about 40° above the horizontal. Referring particularly to FIG. 4, it will be seen that the sidewalls 84 and 86 have inwardly sloped sections 136 and 138 respectively. Preferably the side walls 84 and 86 from angled inwardly from the vertical by from about 40° to about 60°.

Figure 5:
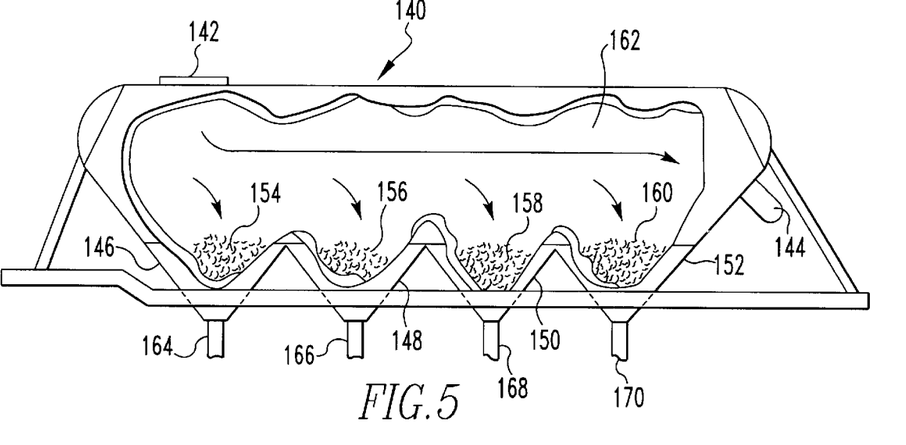
FIG. 5 is a cutaway front elevational view similar to the settling tank shown in FIG. 1.
Figure 6:
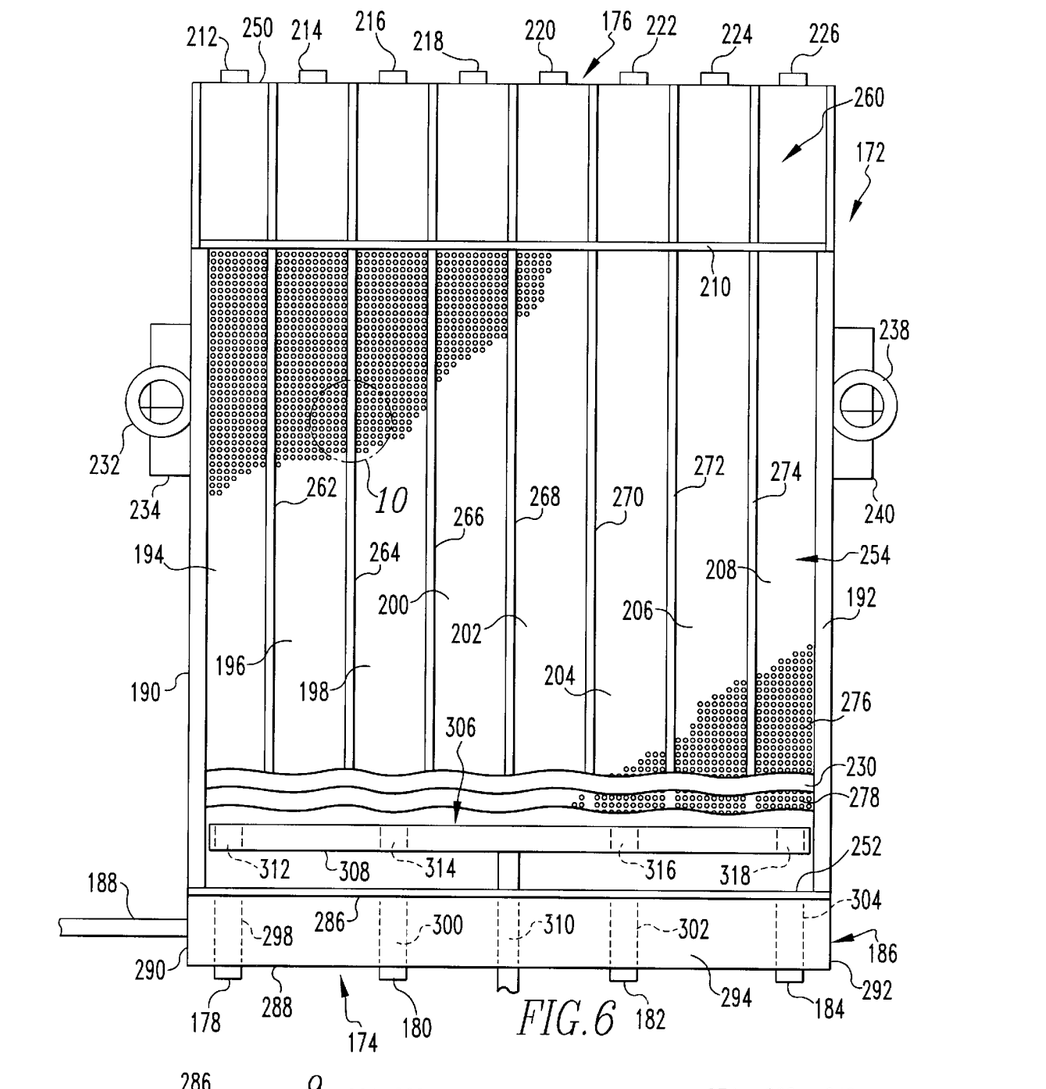
FIG. 6 is a top plan view of the hydraulic press similar to the hydraulic press shown in FIG. 1.
Figure 7:
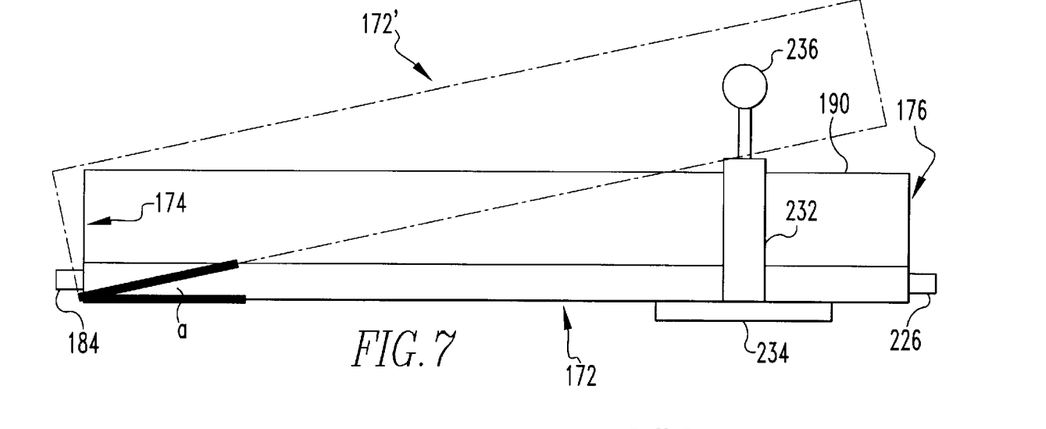
FIG. 7 is a side elevational view of the hydraulic press shown in FIG. 6.
Figure 8:
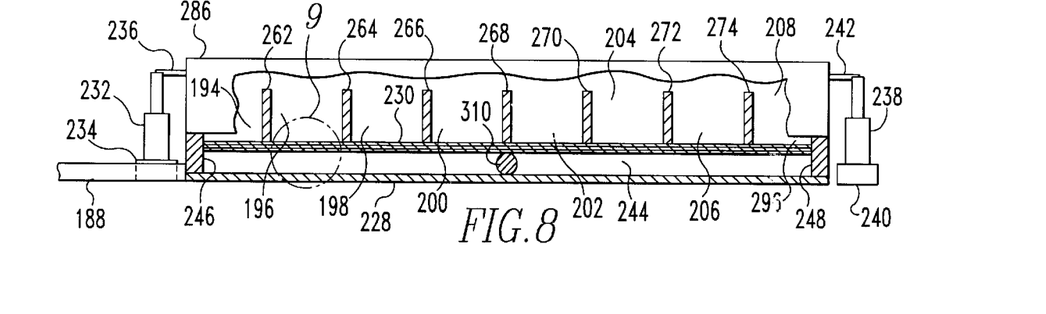
FIG. 8. Is a front elevational view of the hydraulic filter press shown in FIG. 6.

Referring to FIG. 5, another embodiment of the clarification tank is shown generally at numeral 140 which includes a tank input line 142 and a tank output line 144. In this embodiment, there are four settling sections 146, 148, 150, and 152. These settling sections have high floc density areas 154, 156, 158, and 160. Above these high floc density areas there is a clarified supernatant water area 162. The settling sections are respectively discharged in lines 164, 166, 168, and 170. The concentration of floc will be greatest in settling section 146, and will decrease from section 148 to section 150, and wherein the floc concentration will be the lowest in section 152. It will be appreciated that more of fewer settling sections may be used to optimize results in particular situations.

Referring to FIGS. 6–10, another embodiment of the hydraulic filter press element is shown generally at numeral 172 which has an input side 174 and a discharge side 176. On the input side 174 there are input line connections 178, 180, 182, and 184. Adjacent the input side 174 there is a transverse trough 186 from which a water discharge line 188 extends for discharge of purified water from the system. The hydraulic filter press 172 also has lateral walls 190 and 192, and longitudinal troughs 194, 196, 198, 200, 202, 204, 206, and 208 are interposed. Extending between the lateral walls 190 and 192 there is a transverse wall 210. On the discharge side 176 of the hydraulic filter press 172, there are restricted output apertures 212, 214, 216, 218, 220, 222, 224, and 226. The hydraulic filter press 172 also has a base wall 228 and a top wall 230. The hydraulic filter press 172 is supported by piston and cylinder combination 232 which rests on a base 234 and is connected to a axle 236. At its opposed side the hydraulic filter press 172 is supported by piston and cylinder combination 238 which is mounted on a base 240 and attached to an axle 242. These piston and cylinder combinations 232 and 238 cooperatively adjust the height of the hydraulic filter press 172 from a lowered position as shown in solid lines and to an elevated inclined position as is shown at 172' in phantom lines in FIG. 7. The angle of inclination of the position of the elevated hydraulic position of hydraulic filter press 172 will be in the range of 0° to about 40° and depending on the concentration of the particles in the water often more preferably in the range of about 20° to about 40°.

Figures 9, 10:
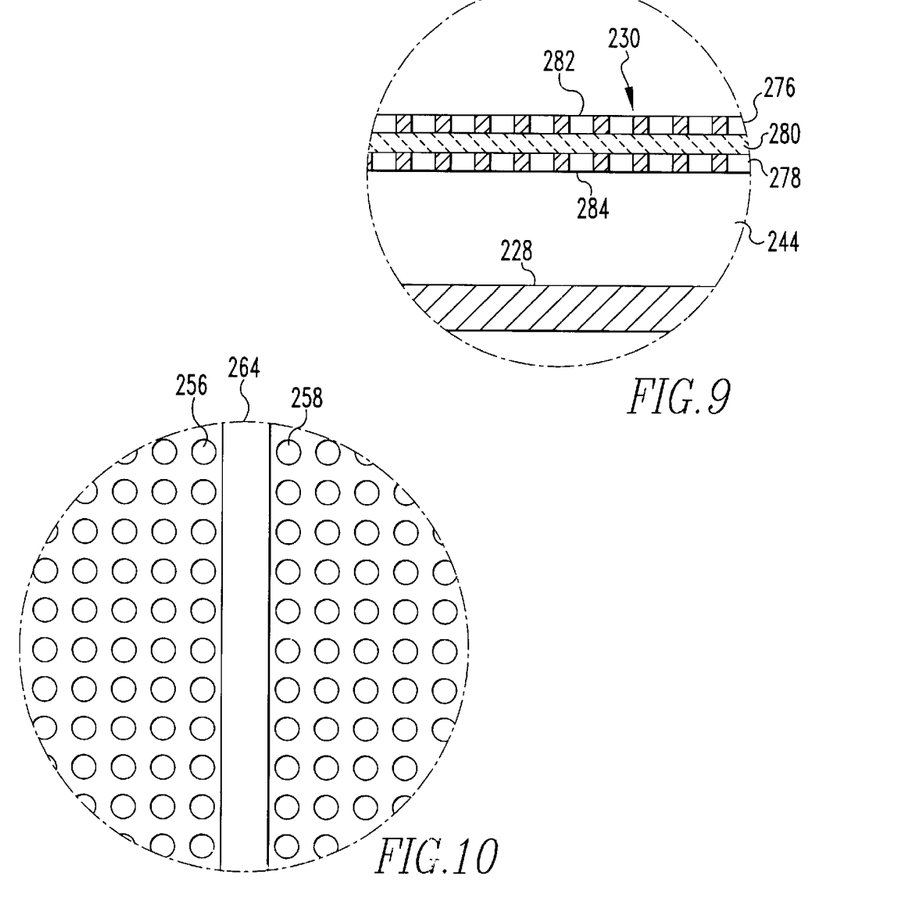
FIG. 9 is a detailed view of circle 9 in FIG. 8.
FIG. 10 is a detailed view of circle 10 in FIG. 6.
Figure 11:
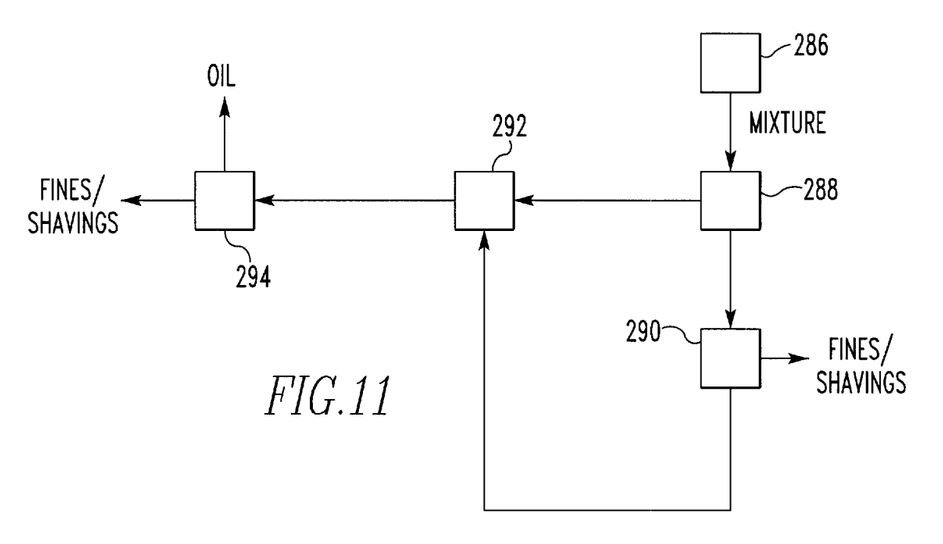
FIG. 11 is a flow chart illustrating the method of dewatering coal tailings and slurries and removing contaminants therefrom in accordance with the present invention.

The hydraulic filter press 172 includes a flow cavity 244 which is bonded by the bottom wall 228, the top wall 230, side wall 246, side wall 248, front wall 250 and rear wall 252. The top wall 230 has a perforated section 254 with a plurality of vertical perforations connecting to the flow cavity 244. Such perforations are shown as, for example, perforations 256 and 258 in FIG. 10. Preferably, these perforations are circular and about one inch in diameter and are separated from each other by about ¼ inch so that there are about 108 perforations per square foot on the perforated section 254 of top wall 230. Positioned in parallel arrangements perpendicularly to wall 230 there are a plurality of longitudinal walls 262, 264, 266, 268, 270, 272, and 274 which define longitudinal troughs 194, 196, 198, 200, 202, 204, 206, and 208. Referring particularly to FIG. 9, it will be seen that the top wall 230 is comprised of a rigid top section 276, a rigid bottom section, 278 and a medial textile section 280 which is preferably comprised of a woven synthetic material. It will also be seen that there are perforations as at perforation 282 in the top section 276 and perforations as at perforation 284 in the bottom section. Each perforation in the top section as at perforation 282 is vertically aligned with another perforation as at perforation 284 in the bottom section 278. The transverse end trough 186 is comprised of a front wall 286, a rear wall 288, end wall 290, end wall 292, and base wall 294. It will be appreciated that the trough has an open top side. There is a gap 296 between the bottom of the front wall 286 and the top wall 230 of the flow cavity 244. Because of this gap 296, water flows from longitudinal troughs 194, 196, 198, 200, 202, 204, 206, and 208 into the transverse trough 186 and is then outputted through line 188. It will also be seen that there are transverse pipes 298, 300, 302, and 304 for conveying water and suspended particles respectively from input line connections 178, 180, 182 and 184 to flow cavity 244. Positioned in the flow cavity 244 there is also a movable plunger 306 which includes a head 308 and an extendable rod 310. There are apertures 312, 314, 316, and 318 through the head 308 to allow water with suspended particles to pass from the rear to front side of the head 308. The plunger 306 would be extendable to move particles to the front wall 250 of the flow cavity 244. It will be understood that ordinarily the use of this plunger would be optional and that in many situations water and suspended particles will move to the front wall 250 merely by applying sufficient pressure from the rear wall 252. It will also be understood that the angle of inclination of the filter press can be selected to most efficiently remove the particles from the water. It will also be appreciated that greater angles of inclination will ordinarily be required when the concentration of particulate matter in the water increases while at low concentrations it may be possible to use a 0° inclination. It will be appreciated that other equivalent means of separating the floc from the water such as a centrifuge, a screw press, a belt filter, or a screen could, within the scope of this invention, be substituted for the filter press 172.

EXAMPLE

A mixture of water and fine coal as well as clay, silt, mud, and pyrite contaminants are removed from a coal refuse slurry pond resulting from an industrial coal washing operation. This coal refuse slurry pond contained coal tailings from the No. 4 and No. 5 Upper Kittanning and Middle Kittanning seams mined in Tuscarawas County, Ohio. The mixture was removed from the coal refuse slurry pond by means of a 8 inch perforated dredge at the rate of 1,200 gallons/minute. This mixture of water, fine coal and contaminants varied from about 60–80% by weight water. The fine coal in this mixture varied from about 0.25 inch down to about 0.001 inch. A typical sample of this input mixture of coal tailings, contaminants and water was recovered and analyzed as recovered and after drying. The results of this analysis are shown in Table 1, wherein the ASTM method of analysis for each material is indicated adjacent the material and all reported percentages are percent by weight. The coal tailings, contaminant and water mixture was moved in a 8 inch diameter pipe at a speed of 1200 gallons/minute over a distance of 500 feet to the input point of a drag tank generally as shown in FIGS. 2–4 above. In this drag tank the chain conveyors had flights that were 12 inches high and 24 inches wide inset at the bottom of the tank. The tank was approximately 8 feet wide and 18 feet long at water level and had a capacity of 80 gallons. The conveyor continued above water level so at least 10 feet of conveyor was used to dewater the coal before it was discharged. The tank was approximately 8 feet in depth at its rear end. The chain conveyor was operated at a speed of 10 feet/minute. The water discharge trough at the rear end of the tank was 6 feet wide and 10 inches deep at the rim of the rear end of the tank. Partially dewatered fine coal along with contaminants were removed by the conveyor from the drag tank at a rate of about 8 tons/hour (266 pounds/minute) to an EB-48 centrifugal dryer which was procured from CMI, Inc. of St. Louis, Mo. Before being introduced to the centrifuge, this mixture of fine coal, contaminants and water had a water content of about 80 percent by weight. The centrifugal dryer was operated at a rate of 2,600 RPM to allow the fine coal to fluff out and be discharged to a conveyor belt at a rate of about 8 tons/hour (266 pounds/minute). Water effluent with suspended contaminants was removed from the centrifugal dryer at a discharge pipe at a rate of 10 gallons/minute to a 1,000 gallon capacity settling tank. Water along with settling contaminants were removed from this settling tank at a rate of 4 gallons/minute to a polymer addition tank where CALGON POL-E-Z 652 nonionic emulsion polymer which is commercially available from Nalco Chemical Company located at Naperville, Ill. so that the overall amount of polymer used in the water and contaminants introduced to the clarifier was 3% by weight. Water along with suspended contaminants and the added polymer are then moved to the tank discharge trough at a rate of 1,100 gallons/minute and added to the water being removed from the discharge tank and the water, contaminants and polymers were then added to the clarifier tank at a rate of 1,100 gallons/minute. The clarifier tank had a length of 10 feet and a capacity of 500 gallons and was similar to that shown in FIG. 5 above. Clarified supernatant water was removed from the tank outlet type at a rate of 30 gallons/minute. Floc and water were removed from each of the settling sections of the tank at a rate of about 4 pounds/minute to a hydraulic filter press by a 3 inch diaphragm pump operated by air. The hydraulic filter press was similar to the one shown in FIGS. 6–10. The overall length of this hydraulic filter press was 11 feet whereas the longitudinal troughs were 10 feet in length and 1 foot in width. The overall width of the hydraulic filter press was 8 feet. The overall height of the filter press was 18 inches while the height of the longitudinal troughs of 12 inches. The metal insert for the hydraulic press serves as a strainer and was made of ¼ inch punch plate which was kept 2 inches from all sides and the bottom so that the water can easily discharge to the clear water. On the inside of the ¼ inch punch plate, a polyester and vinyl textile material was held to the sides with plastic strips. The hydraulic filter press was positioned horizontally, i.e. with a 0° incline between its input and output ends. The hydraulic plunger was lined on the outside ends with a tube filled with grease so that it could clean the cloth and not tear. The plunger operated only when the press no longer took in material from the 3 inch diaphragm pumps. The plunger then pushed and caused the water left in the insert to discharge leaving dry solid clay and dirt to be removed to the stock pile area. Removal to the stock pile area was accomplished on discharge belts which was 24 inches wide and approximately 20 feet long at a rate of 4 pounds/minute. The purified water discharged from both the hydraulic filter press and the clarifier tank was found to be substantially free of both fine coal and suspended clay and other contaminants. A typical sample of the moist solid output material was recovered and analyzed as recovered and after drying. The results of this analysis are shown in Table 2 wherein the ASTM method of analysis for each material is indicated adjacent to the material and all reported percentages are percent by weight. For the purposes of this disclosure, "ash" is considered to be the solid incombustible material present within the meaning of the cited ASTM method.

TABLE 1

| Material | As Recovered | After Drying | ASTM Method |
| --- | --- | --- | --- |
| Moisture | 32.34% | — | D-2961 M, D-3173 |
| Ash | 29.07% | 42.96% | D-3174 |
| Sulfur | 1.80% | 2.66% | D4239 |
| Heat Content | 4.987 BTU/lb | 7,371 BTU/lb | D-1989 |

TABLE 2

| Material | As Received | After Drying | ASM Method |
| --- | --- | --- | --- |
| Moisture | 13.00% | — | D-2961 M, D-3173 |
| Ash | 9.27% | 10.66% | D3174 |
| Sulfur | 2.00% | 2.30% | D-4239 |
| Heat Content | 10,918 BTU/lb | 12,550 BTU/lb | D-1989 |

Those skilled in the art will appreciate that the method and apparatus described herein may be used to dewater substantially clean coal slurry products which are used in the art to transport fine coal from the point of production to the point of use. It will also be understood that the method and apparatus of the present invention will have the advantage of removing a residual portion of any solid contaminants which may be present in the coal slurry product so that such contaminants are not present in either the fine coal or the process water recovered from the coal slurry product.

In addition to the treatment of fine coal, dewatering is also necessary in other areas of mineral processing. Those skilled in the art will appreciate that the method and apparatus of the present invention may be used to dewater and/or decontaminate a variety of such mineral slurries. Non-limiting examples of such slurries include sand and gravel, slurries of limestone, and ores, including, for example, taconite, trona, and titania. Guidance to those of ordinary skill in the art in coagulating or flocculating specific materials is contained, for example, in *Coagulation and Flocculation. Theory and Applications*, edited by Bohuslav Dobias, University of Regensburg, Regensburg, Germany (published by Marcel Dekker, Inc., New York, 1993), particularly at pages 126–137, which is incorporated herein by reference.

The term "particle" as it is used herein, means any small piece of a solid material, wherein that material may be one which is referred to as a particulate material as well as those materials which may be otherwise referred to in the art as a fine, powdered, pulverized, fragmented, or granular material or by like terms. For the purposes of this disclosure, a "particulate material" is a material comprised at least in part of particles.

The term "suspended" as it is used herein refers to the condition of a particle of a certain material or group of materials as being mixed within a liquid in a generally dispersed manner. The fact, however, that some particles of a material are heavier than other particles of the same material and may tend, therefore, to collect nearer the bottom of a liquid body than such lighter particles, is not intended to mean that the overall group of particles of the material does not fall within this definition.

The term "slurry", as it is used herein, means any free flowing or flowable suspension of particles in a liquid. It is not intended that a mixture of particulate material and a liquid should be excluded from this definition merely because of the existence of a minor proportion of oversized particles in this mixture.

It will be appreciated that the method and apparatus described in this application is a simple and cost effective means for treating water and fine coal and contaminants found in tailing ponds from commercial coal washing operations. Water at ambient pressure which is substantially free of both fine coal and clay and other contaminants is recovered. Substantial amounts of dry, combustible fine coal are also recovered.

It will also be appreciated that the present invention provides an efficient and cost effective method and apparatus for dewatering substantially clean coal slurries and removing any contaminants present therefrom.

It will also be appreciated that the present invention provides an efficient and cost effective method and apparatus for dewatering other mineral slurries and removing any contaminants therefrom.

It will also be appreciated that the present invention provides an efficient and cost effective method and apparatus for reclaiming valuable process water from substantially clean coal slurry products.

It will also be appreciated that the present invention provides an efficient and cost effective method and apparatus for reclaiming valuable process water from other mineral slurries.

It will also be appreciated that the present invention provides an efficient and cost effective method and apparatus for reclaiming valuable land resources from land previously occupied by coal refuse slurry ponds.

It will also be appreciated that the present invention provides an efficient and cost effective method and apparatus for a ameliorating or eliminating any environmental risk to soils and water tables which may be presented by coal refuse slurry ponds.

It will also be appreciated that the present invention provides a method and apparatus for efficiently and cost effectively dewatering coal tailings and removing contaminants therefrom which is mobile and can readily be moved to coal refuse slurry ponds in remote, hilly or mountainous locations.

It will also be appreciated that the present invention provides a method and apparatus for efficiently and cost effectively dewatering coal tailings and removing contaminants therefrom which is compact and adapted to being used on sites where the available land for such operations is limited or where such available land is located on hilly, mountainous or otherwise uneven terrains.

Accordingly, the improved METHOD AND APPARATUS FOR DEWATERING COAL TAILINGS AND SLURRIES AND REMOVING CONTAMINANTS THEREFROM is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the METHOD AND APPARATUS FOR DEWATERING COAL TAILINGS AND SLURRIES AND REMOVING CONTAMINANTS THEREFROM is practiced, constructed and used, the characteristics of the construction, and the advantageous new and useful results obtained; the new and useful structures, devices, elements, arrangements, parts, and combinations are set forth in the appended claims.

What is claimed:

1. A method of dewatering a mixture of coal railings, water and contaminants from a coal refuse slurry pond, the method comprising the steps of:
   (a) providing a tank having a base surface and introducing said mixture of coal, tailings, water, and contaminants to said tank and allowing said coal tailings to settle on said base surface, where the tank has an entry point where the mixture of tailings, water and contaminants are introduced into the tank and a discharge point where the coal tailings, water, and contaminants are removed from the tank, and where said entry and discharge points are both elevated from the base surface;
   (b) removing the coal tailings from said base surface of said rank along with water and contaminants with a conveyer system, and then separating said water and at least some of said contaminants from said coal tailings wherein said separated contaminants are suspended in said separated water;
   (c) adding an agent selected form one or more of the group consisting of a coagulant and a flocculent to said water and suspended contaminants separated from the coal tailings in step (b);
   (d) allowing the agent added in step (c) to coagulate or flocculate with the suspended contaminants to form a coagulated or flocculated mass and a quantity of supernatant water; and
   (e) separating the coagulated or flocculated mass formed in step (d) from the quantity of supernatant water formed in step (d).

2. The method of claim 1, where said entry point is laterally displaced from said discharge point.

3. The method of claim 2 wherein the mixture of coal tailings, water and contaminants is continuously introduced to the tank in step (a) and the coal tailings, water and contaminants are continuously removed from the tank in step (b).

4. The method of claim 1 wherein in step (b) the coal tailings are separated from the water and contaminants by means of a centrifuge.

5. The method of claim 4 wherein at least some of the contaminants removed with the coal tailings and water in step (b) are suspended in said removed water.

6. The method of claim 5 wherein the coal tailings have a size of about ¼ inch and less.

7. The method of claim 4 wherein at least some of the contaminants removed with the coal tailings and water in step (b) are initially adhered to the coal tailings and are then removed from said coal tailings by centrifugation.

8. The method of claim 1 wherein in step (c) one or more of the group consisting of a coagulant and a flocculent is a flocculent and the flocculent is selected from the group consisting of a cationic polymer, an anionic polymer, and a nonionic emulsion polymer.

9. The method of claim 8 wherein in step (c) the flocculent is used in an amount of from about 2 percent to about 6 percent by weight of the water and the suspended contaminants.

10. The method of claim 1 wherein the contaminants include clay.

11. The method of claim 1 wherein the contaminants are selected from one or more of the group consisting of clay, silt, mud, and pyrite.

12. The method of claim 1 wherein in step (c) the water and the suspended solid contaminants are introduced to a clarifying second tank wherein coagulation or flocculation in said second tank in step (d) takes place.

13. The method of claim 12 wherein, in step (c), the water and suspended contaminants separated from the coal tailings in step (b) are first removed to a settling tank after which the agent selected from one or more of the group consisting of a coagulant and a flocculent is added before said water and suspended contaminants are added to the clarifying tank.

14. The method of claim 12 wherein the first tank has a rim and water flows directly from the first tank adjacent the rim to the clarifying tank.

15. The method of claim 1 wherein the coagulated or flocculated mass formed in claim (d) contains an additional quantity of water and at least some of said additional quantity of water is removed from the coagulated or flocculated mass after said coagulated or flocculated mass is separated from the quantity of supernatant water in step (e).

16. The method of claim 15 wherein at least some of said additional quantity of water is removed from the coagulated or flocculated mass in a press.

17. The method of claim 15 wherein the quantity of supernatant water and the additional quantity of water separated from the coagulated or flocculated mass are substantially free of contaminants.

18. The method of claim 1 wherein in step (a), before being introduced to the first tank, the water in the mixture is adjusted so that the mixture is from about 60 percent to about 90 percent by weight water.

19. The method of claim 1 wherein the coal tailings, contaminants and water removed from the tank in step (b) is from about 10 percent to about 40 percent by weight water.

* * * * *